United States Patent
Wille et al.

(10) Patent No.: US 11,297,825 B2
(45) Date of Patent: Apr. 12, 2022

(54) DECOY MOTION SYSTEM

(71) Applicant: White Rock Decoys, LLC, La Crosse, WI (US)

(72) Inventors: James Wille, La Crosse, WI (US); Adam Steinberg, Blooming Prairie, MN (US); Jake Greseth, Winona, MN (US)

(73) Assignee: White Rock Decoys, LLC, La Crosse, WI (US)

( * ) Notice: Subject to any disclaimer, the term of this patent is extended or adjusted under 35 U.S.C. 154(b) by 193 days.

(21) Appl. No.: 16/555,420

(22) Filed: Aug. 29, 2019

(65) Prior Publication Data

US 2020/0068874 A1   Mar. 5, 2020

Related U.S. Application Data

(60) Provisional application No. 62/724,312, filed on Aug. 29, 2018.

(51) Int. Cl.
*A01M 31/06* (2006.01)
*F16M 11/12* (2006.01)

(52) U.S. Cl.
CPC .......... *A01M 31/06* (2013.01); *F16M 11/126* (2013.01)

(58) Field of Classification Search
CPC ............................ A01M 31/06; F16M 11/126
USPC .................................. 43/2, 3; 248/530, 533
See application file for complete search history.

(56) References Cited

U.S. PATENT DOCUMENTS

| | | | |
|---|---|---|---|
| 6,216,382 B1 * | 4/2001 | Lindaman | A01M 31/06 248/156 |
| 7,493,723 B2 | 2/2009 | Hess | |
| 7,694,451 B1 | 4/2010 | Zink, Jr. | |
| 7,716,866 B2 * | 5/2010 | Zink, Jr. | A01M 31/06 43/3 |
| 8,082,690 B2 | 12/2011 | Zink, Jr. | |
| 8,188,691 B1 * | 5/2012 | Twohig | A01M 31/06 318/139 |
| 2006/0053675 A1 * | 3/2006 | Lindaman | A01M 31/06 43/2 |
| 2006/0143970 A1 | 7/2006 | Lindaman | |
| 2007/0062093 A1 | 3/2007 | Hess | |
| 2007/0180754 A1 | 8/2007 | Neeley et al. | |
| 2013/0333267 A1 * | 12/2013 | Olien | F16B 2/20 43/2 |
| 2014/0144062 A1 * | 5/2014 | Barley | A01M 31/06 43/2 |

(Continued)

*Primary Examiner* — Muhammad Ijaz
(74) *Attorney, Agent, or Firm* — Winthrop & Weinstine, P.A.; Alicia Griffin Mills

(57) ABSTRACT

A decoy system includes a ground stake, a decoy body, and a ground stake topper. The ground stake includes a first end and a second end configured to support the decoy system. The decoy body includes an outer surface, an inner surface, a bottom opening through which the ground stake extends, and a top opening. The ground stake topper is configured to extend into the top opening of the decoy body with the ground stake topper having a base connected to the ground stake, a head, and a neck between the base and the head. The neck is smaller in area than the top opening. The neck of the ground stake topper is configured to be held within the top opening of the decoy body to allow the decoy body to moderately tilt and rotate relative to the ground stake topper.

20 Claims, 9 Drawing Sheets

(56) References Cited

U.S. PATENT DOCUMENTS

2015/0208641 A1\* 7/2015 Gurner, III ............. F16M 11/18
                                                                              43/2
2016/0309705 A1\* 10/2016 Johnson ................ A01M 31/06
2020/0367486 A1\* 11/2020 Butz ...................... F16M 11/08

\* cited by examiner

DECOY MOTION SYSTEM

CROSS-REFERENCE TO RELATED APPLICATION(S)

This application claims the benefit of U.S. Provisional Application No. 62/724,312 filed Aug. 29, 2018, for "DECOY MOTION SYSTEM" by J. Wille, A. Steinberg and J. Greseth.

BACKGROUND

The present disclosure relates to decoys for watching and/or hunting birds and, in particular, to a motion and support system for a decoy body.

Decoys are utilized to attract birds, such as waterfowl, for the purposes of drawing the birds within distance to watch and/or hunt. Decoys vary in size, shape, and movement. Some decoys are stationary and allow for no movement of the decoy body. Others are animatronic or utilize wind to provide movement of the decoy body. Often times, the movement of the decoy body is unrealistic (e.g., does not mimic the movement of the bird) due to the design of the decoy motion system. Much time and effort has been put into making the movement of the decoy body as realistic as possible so as to better attract the birds. However, realistic motion systems are complex and expensive. Additionally, such motion systems are often times bulky/heavy, making transport of the motion system and decoy body problematic. Thus, a decoy motion system that is simple, light weight, and realistically mimics the movement of the birds would be advantageous to hunters, bird watchers, and others in need of life-like bird decoys.

SUMMARY

A decoy system for attracting birds includes a ground stake, a decoy body, and a ground stake topper. The ground stake includes a first end and a second end configured to support the decoy system. The decoy body includes an outer surface, an inner surface, a bottom opening through which the ground stake extends, and a top opening that has a first elongated shape. The ground stake topper is configured to extend into the top opening of the decoy body with the ground stake topper having a base connected to the ground stake, a head, and a neck between the base and the head. The neck has a second elongated shape that is smaller in area than the first elongated shape of the top opening. The neck of the ground stake topper is configured to be held within the top opening of the decoy body to allow the decoy body to moderately tilt and rotate relative to the ground stake topper.

A decoy system that allows tilting and rotation of a decoy body. The decoy system includes the decoy body having a void with a first opening on a top side and a second opening on a bottom side, a stake for supporting the decoy body with the stake having a first end configured to extend through the void in the decoy body and a second end, and a topper having a base connected to the first end of the stake, a neck connected to the base and configured to extend through the first opening in the decoy body, and a head connected to the neck and configured to hold the decoy body adjacent to the topper. The first opening of the decoy body and the neck of the topper are sized and shaped to allow for the decoy body to tilt vertically up to forty degrees relative to the topper and rotate horizontally up to sixty degrees relative to the topper.

DETAILED DESCRIPTION

A decoy system for use in attracting birds, such as waterfowl, is disclosed herein that includes a decoy body, a ground stake, and a ground stake topper. The decoy body is sized and shaped to look like the body of the bird that is intended to be attracted. The ground stake is configured to support the decoy system to stand the decoy body substantially vertically upright. The ground stake topper has a head, neck, and base. The neck is sized to correspond to and extend through a top opening in the decoy body. The neck is held adjacent to the decoy body by the head and the base of the ground stake topper. The top opening of the decoy body has a first elongated shape, and the neck of the ground stake topper has a second elongated shape with an area that is smaller than that of the first elongated shape of the top opening. The size and shape of the neck is configured to allow the decoy body to tilt in every direction and rotate/twist horizontally in each direction relative to the ground stake topper (the tilt and rotation of the decoy body are collectively referred to as wobble). The decoy system is a simple, inexpensive, and light-weight motion system that is able to wobble to realistically mimic the movement of the bird.

The decoy system is described herein with regards to a vertical direction and first and second horizontal directions (with the first direction extending along a length of the decoy body and the second horizontal direction being perpendicular to the first horizontal direction). However, the decoy system can have any orientation. "Vertical" and "horizontal" are used only to more easily describe location of components relative to each other and does not limit the decoy system to a particular orientation relative to the ground upon which the decoy system can be placed. For explanation only, the decoy system is described herein with the ground stake extending in a vertical direction, the length of the decoy body extending in the first horizontal direction, and the width (perpendicular to the length) of the decoy body extending in the second horizontal direction. As shown, the length of the decoy body is greater than the width of the decoy body.

Figure 1A:
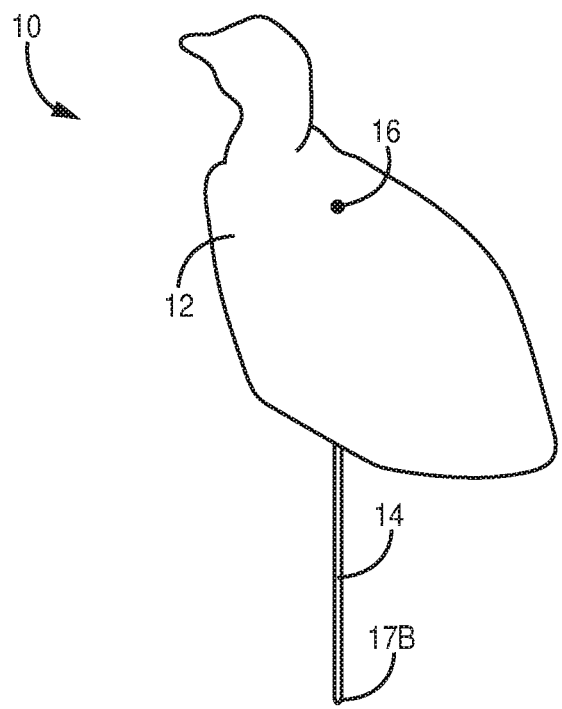
FIG. 1A is an isometric view of a decoy system.
Figure 1B:
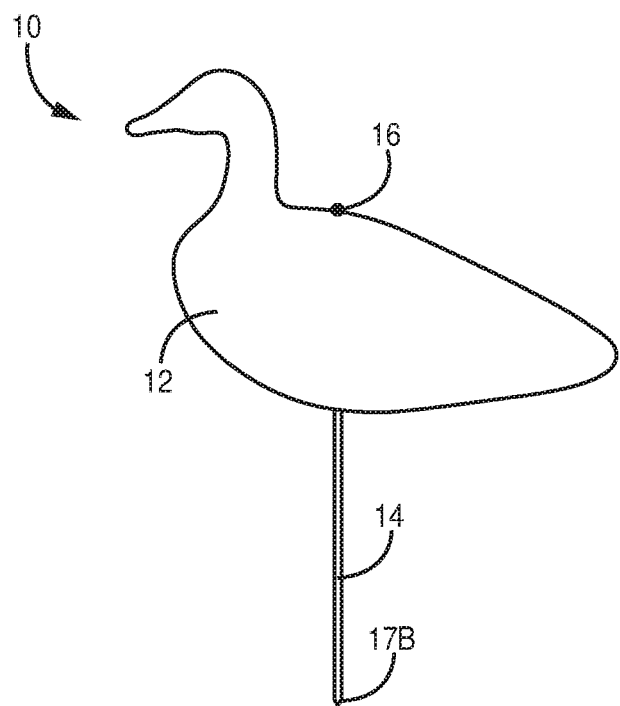
FIG. 1B is a side perspective view of the decoy system.
Figure 1C:
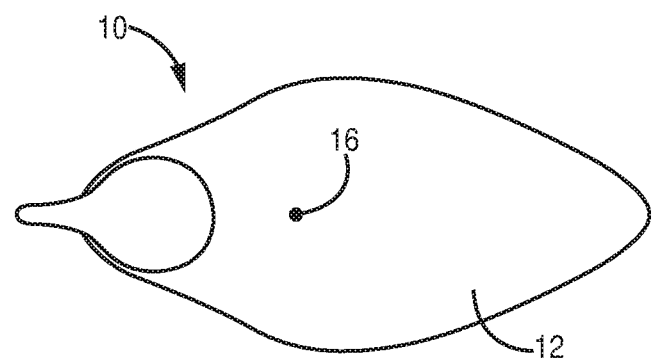
FIG. 1C is a top perspective view of the decoy system.

FIG. 1A is an isometric view of a decoy system, FIG. 1B is a side perspective view of the decoy system, and FIG. 1C is a top perspective view of the decoy system. Decoy system 10 includes decoy body 12, ground stake 14, and ground stake topper 16.

Ground stake 14 provides structural support to decoy body 12 and connects to ground stake topper 16 at a top end. As shown, ground stake 14 is an elongated pole/rod that extends between top end 17A and bottom end 17B. Bottom end 17B can be inserted into the ground to stand ground stake 14 vertically upright, and ground stake topper 16 and decoy body 12 are on top end 17A of ground stake 14. (top end 17A is shown in FIGS. 4A-4F). Bottom end 17B of ground stake 14 can be pointed to provide for easier insertion into the ground, or bottom end 17B can have another configuration, such as a disc-like base, feet, or another component that keeps ground stake 14 upright. While shown as extending substantially vertical relative to the ground upon which ground stake 14 is located, ground stake 14 can be tilted in any direction to lean decoy body 12 forward, rearward, or to either side. Further, ground stake 14 does not need to be a straight rod and can be configured to have bends, turns, or other features. Ground stake 14 can be constructed from a variety of materials, including plastic, metal, a composite, a polymer, or another material. Additionally, if desired, ground stake 14 can be constructed from a material that is elastic to allow for bending, twisting, and other motion to increase the amount of tilt and/or rotation of decoy body 12 caused by wind or other external forces. However, ground stake 14 should be sufficiently rigid to support decoy body 12 without breaking.

Figure 2A:
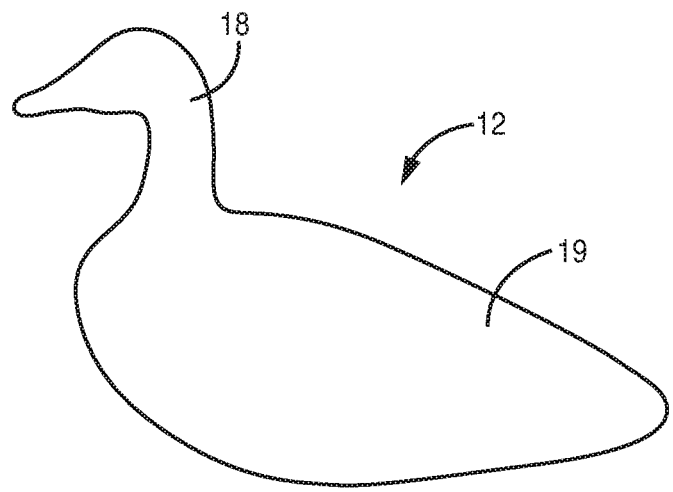
FIG. 2A is a side perspective view of a decoy body of the decoy system.

Decoy body 12 (shown in isolation in FIGS. 2A, 2B, and 2C) includes decoy head 18 and decoy torso 19. Decoy head 18 is located on a top side of decoy body 12 vertically above decoy torso 19. Head 18 and torso 19 are sized, shaped, and colored to look similar to a bird intended to be attracted by decoy system 10. For example, decoy body 12 can be sized, shaped, and colored to look like a Canada goose, snow goose, or various species of duck. Head 18 can be solid, hollow, and/or detachable from torso 19 to improve durability and transportability while allowing for different heads 18 to be used with different torsos 19. Alternatively, head 18 and torso 19 can be one continuous and monolithic component that is molded or otherwise manufactured as a single component. Decoy body 12 can be constructed from a variety of materials, such as plastic, a composite, a polymer, or another material. The material used to construct decoy body 12 can be substantially elastic to allow for deformation of decoy body 12 (which may occur during setup and/or storage) while still returning to the intended, full shape and size of decoy body 12. Decoy body 12 is configured to be held by ground stake 14 in a position such that decoy head 18 is on a top side and decoy torso 19 is on a bottom side with ground stake 14 extending downward from decoy body 12.

Decoy torso 19 extends substantially in the first horizontal direction with a length that is greater than a width, which extends in the second horizontal direction. Decoy torso 19 looks similarly to the torso of a bird that is intended to be attracted by decoy system 10. Decoy torso 19 can be mostly solid or entirely hollow. Decoy torso 19 as shown includes void 20, which is at least a substantially frustoconical void extending from bottom opening 22 (shown in FIG. 2C) to top opening 24 (shown in FIGS. 2B and 2C). Along with void 20, decoy torso 19 also includes outer surface 21A and inner surface 21B (shown in FIGS. 4A-4F). It may be advantageous for torso 19 to be hollow to reduce the weight of decoy system 10 to allow for easier transport. Additionally, if torso 19 is hollow, torso 19 may be able to be compressed/pushed in to allow for more space-efficient storage of decoy system 10. While shown as including bottom opening 22 and top opening 24, decoy torso 19 (and decoy head 18) can include other features not expressly disclosed, such as attachment points for feather, internal cavities for electronic bird calling machines, etc.

Figure 2B:
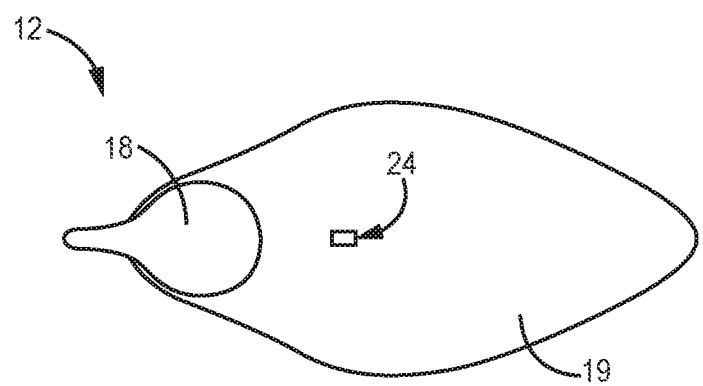
FIG. 2B is a top perspective view of the decoy body.
Figure 2C:
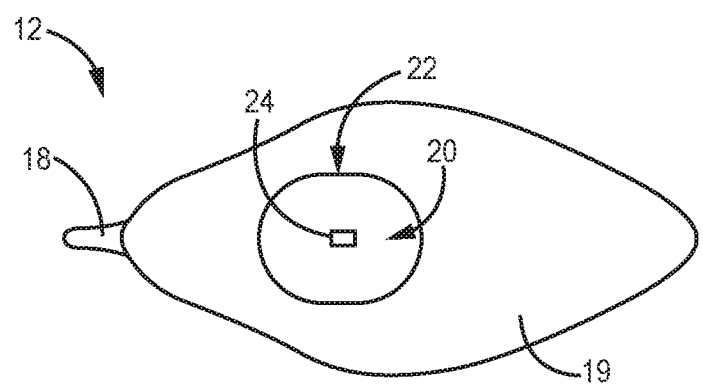
FIG. 2C is a bottom perspective view of the decoy body.
Figure 2D:
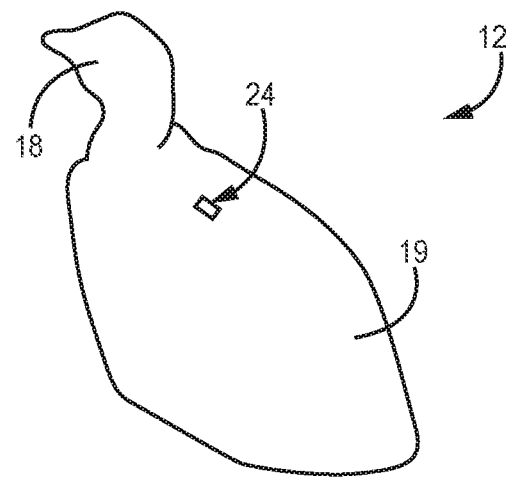
FIG. 2D is an isometric view of the decoy body.

Bottom opening 22 is on a bottom side of decoy torso 19 and is configured to allow ground stake 14 to extend therethrough to interact with ground stake topper 16 within top opening 24. Bottom opening 22 can have a variety of shapes and sizes but should be sized to allow a specific amount of tilt of decoy body 12 relative to ground stake 14 with the tilt of decoy body 12 being stopped by the edges of bottom opening 22. For example, bottom opening 22 can be oval to extend a greater length in the first horizontal direction running along decoy torso 19 than a width extending in the second horizonal direction perpendicular to the first direction (this configuration is shown in FIG. 2C). Bottom opening 22 can be oblong, elliptical, circular, rectangular, or another shape. In the disclosed embodiment, bottom opening 22 is centered about top opening 24 (i.e., top opening 24 is vertically above bottom opening 22).

Top opening 24 is on a top side of decoy torso 19 horizontally rearward of decoy head 18 (in the first horizontal direction) and vertically above bottom opening 22. Top opening 24 is configured to allow ground stake topper 16 to extend through top opening 24 to hold and structurally support decoy body 12. Top opening 24 can be configured to elastically deform slightly when ground stake topper 16 is inserted through top opening 24. As shown in FIGS. 2B and 2C, top opening 24 is rectangular in shape to accommodate neck 32 of ground stake topper 16. The shape of top opening 24 in relation to ground stake topper 16 is important because any open space of top opening 24 that is not filled by neck 32 of ground stake topper 16 allows freedom for decoy body 12 to tilt and rotate (i.e., wobble) to provide for realistic movement of decoy body 12 (i.e., mimicking the movement of a real life bird). Top opening 24 can have a variety of sizes and shapes to correspond to the size and shape of ground stake topper 16 and to customize the amount and type of movement desired by decoy body 12. Top opening 24 is located on the top side of decoy torso 19 at a location such that decoy torso 19 balances on ground stake 14 and does not tilt forward, rearward, or to either side when at rest (i.e., when wind or another external force is not acting upon decoy body 12) and when ground stake 14 extends entirely in the vertical direction to hold decoy body 12 up. However, other configurations of decoy system 10 can include a placement of top opening 24 that has the decoy body 12 tilted forward to, for example, mimic a bird bending forward to eat and/or drink.

Ground stake topper 16 is shown in isolation in FIGS. 3A-3E. Ground stake topper 16 includes topper head 30 at first/top end 28A, neck 32, and base 34 at bottom end 28B. Topper head 30 includes guide line 36. Neck 32 includes fins 38 and core 40. Base 34 includes disk 42, cylindrical portion 43, aperture 44, and guide line 46.

Ground stake topper 16 is connected to ground stake 14 and is configured to extend through top opening 24 to hold decoy body 12 in place while allowing moderate movement of decoy body 12 relative to ground stake topper 16 to mimic the movements of a real-life bird. Ground stake topper 16 has a specific size and shape such that space is present between top opening 24 and neck 32. The specific size and shape of ground stake topper 16 can be modified to provide for increased or decreased tilt and/or rotation of decoy body 12 relative to ground stake topper 16. Ground stake topper 16 and ground stake 14 can be one continuous and monolithic component that is molded or otherwise manufactured as a single component, or ground stake topper 16 and ground stake 14 can be separate components that are easily separable for storage or transport. Additionally, ground stake topper 16 can be removed from ground stake 14 and replaced with a different ground stake topper 16 to modify the tilt and rotation of body decoy 12. Ground stake topper 16 can be constructed from a variety of materials, such plastic, metal, a composite, a polymer, or another material.

Base 34 of ground stake topper 16 is configured to connect ground stake topper 16 to ground stake 14. Ground stake 14 can be inserted into and held within aperture 44 at bottom end 28B. Ground stake topper 16 can be connected to ground stake 14 by other means, such as a bolt, screw, welding, or be one continuous and monolithic component with ground stake 14. Base 34 includes cylindrical portion 43 that houses aperture 44 and includes guide line 46 on an outer surface to provide for easier visual alignment of neck 32 as ground stake topper 16 is being inserted into top opening 24 of decoy body 12. Guide line 46 is useful when looking at top opening 24 in decoy body 12 from the bottom of decoy body 12 through bottom opening 22.

Figure 3A:
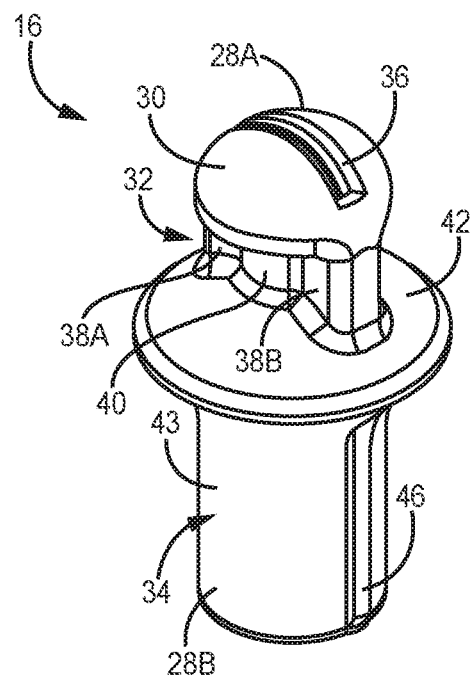
FIG. 3A is an isometric view of a ground stake topper of the decoy system.
Figure 3B:
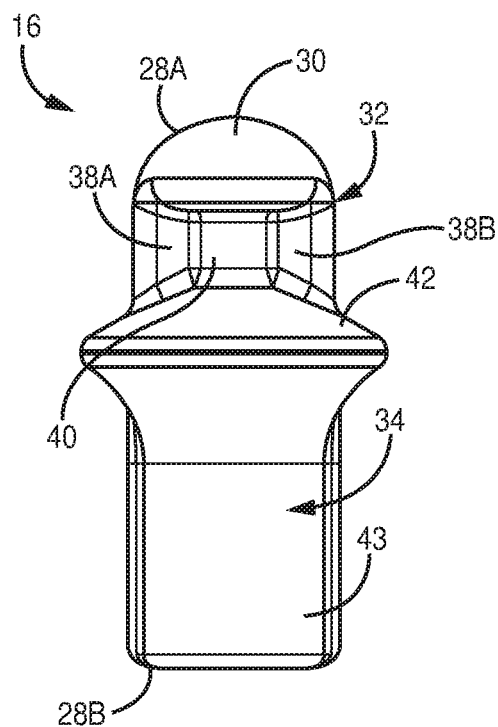
FIG. 3B is a side perspective view of the ground stake topper.
Figure 3C:
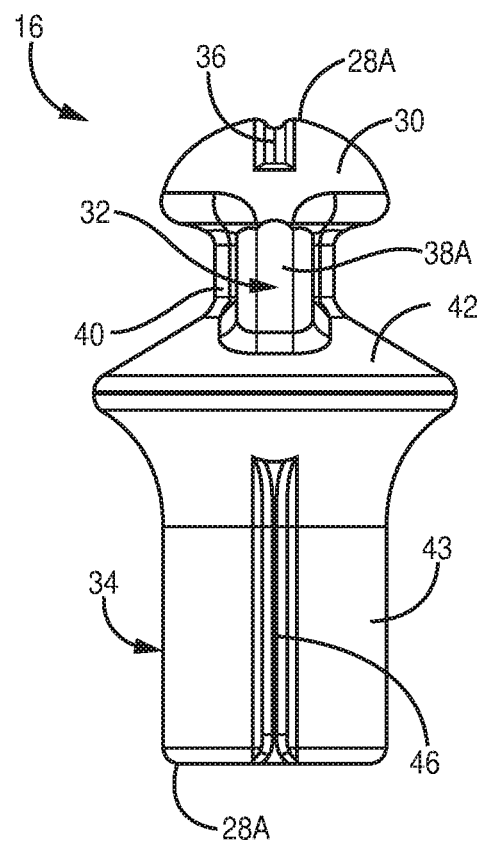
FIG. 3C is a front perspective view of the ground stake topper.
Figure 3D:
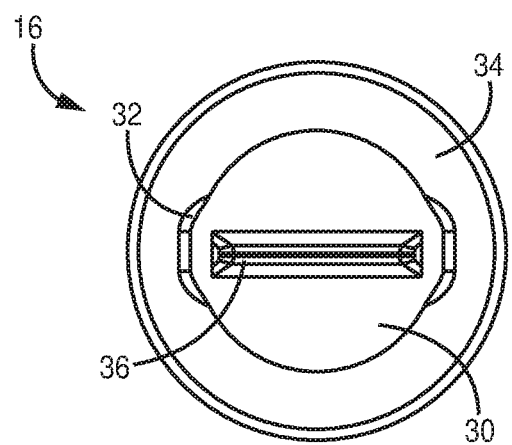
FIG. 3D is a top perspective view of the ground stake topper.
Figure 3E:
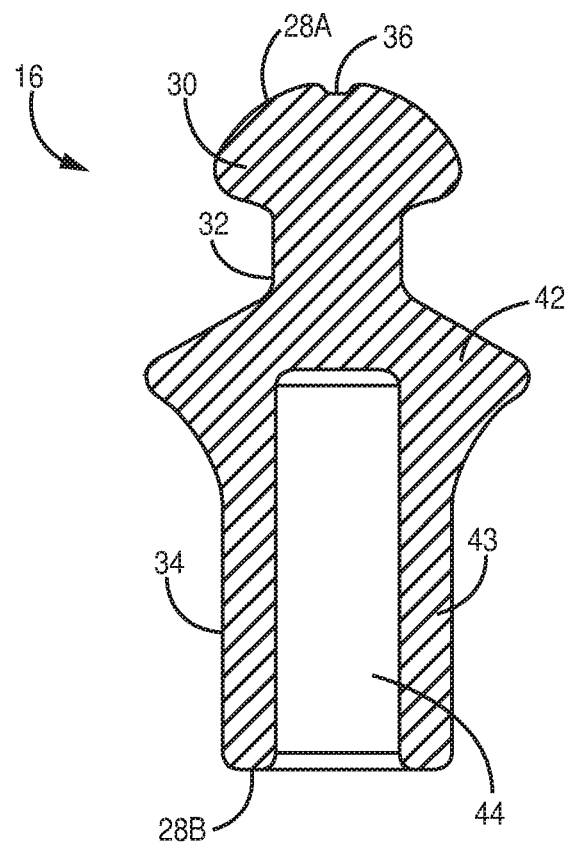
FIG. 3E is a side cross-sectional view of the ground stake topper.

Disc 42 at a top end of base 34. Disc 42 is sized and shaped to provide a top surface upon which the inner surface of decoy body 12 (the inner surface adjacent top opening 24) rests such that decoy body 12 is supported by disc 42 of base 34. While shown as a circular cross-sectional component, disc 42 can have any shape and configuration able to support decoy body 12. Further, while disc 42 is shown as having a greater diameter than a diameter of cylindrical portion 43, other configurations can have disc 42 having the same or a smaller diameter (or a different shape altogether). The top surface of disc 42 can be angled downwards to allow for decoy body 12 to tilt about ground stake topper 14 (i.e., inner surface 21B of decoy body 12 does not rest on a flat top surface of disc 42 and instead rests on an angled top surface to allow for tilting of decoy body 12). In other words, disc 42 can have a cone-like shape to limit the amount of contact disc 42 has with decoy body 12. The small amount of contact between disc 42 and decoy body 12 enables decoy body 12 to tilt and rotate in light winds because there is little resistance. Disc 42 can have other shapes, such as a hemisphere or a configuration that forms a single point of contact with decoy body 12. The downward angle of the top surface of disc 42 can be any degree and can be designed to allow for increased or decreased tilting of decoy body 12. As shown in FIGS. 3B, 3C, and 3E, the downward angle of the top surface of disc 42 is constant throughout the entire circumference of disc 42.

Topper head 30 is at the top of ground stake topper 16 and is configured to extend through top opening 24 so as to be adjacent outer surface 21A of decoy body 12. Topper head 30 ensures that decoy body 12 does not become separated from ground stake topper 16 during operation of decoy system 10. Topper head 30 is connected to neck 32, which in turn is connected to base 34. Topper head 30 can any shape configured to hold decoy body 12 on ground stake topper 16. As shown in FIGS. 3A-3E, topper head 30 is substantially hemispherical with a bottom of topper head 30 being substantially rounded/angled adjacent to neck 32. Topper head 30 has a width that is greater than a width of top opening 24 such that decoy body 12 cannot be separated from ground stake topper 16 (i.e., topper head 30 cannot be pulled downward through top opening 24) without substantially more force than that exerted by the wind. Thus, in normal operations, decoy body 12 is installed upon ground stake topper 16 by pushing topper head 30 through top opening 24 with the portion of decoy body 12 adjacent to and at least partially surrounding top opening 24 deforming slightly momentarily as topper head 30 (which has a larger width than top opening 24) pushes through top opening 24. Topper head 30 should be sized and shaped to correspond to top opening 24 to allow topper head 30 to be pushed or pulled through top opening 24 with the portion of decoy body 12 adjacent to and at least partially surrounding top opening 24 deforming slightly and then springing back to be smaller than the width (or length) of topper head. The underside of topper head 30 can be rounded or angled upwards to allow for decoy body 12 to tilt about ground stake topper 16. The upward angle of the underside of topper head 30 can be any degree and can be designed to allow for increased or decreased tilting of decoy body 12. As shown in FIGS. 3B, 3C, and 3E, the upward angle of the underside of topper head 30 is only located on sides of topper head 30 and is not located on a front or rear side of topper head 30 due to the elongated shape of neck 32. Guide line 36 is on the top of topper head 30 to provide for easier visual alignment of neck 32 as ground stake topper 16 is being inserted into top opening 24 of decoy body 12. Guide line 46 is useful when looking at top opening 24 in decoy body 12 from above decoy body 12.

Neck 32 extends between base 34 and topper head 30 and is configured to be held within top opening 24. Neck 32 has an elongated shape that is smaller in area than the elongated shape of top opening 24 such that neck 32 is able to moderately move within top opening 24 relative to ground stake topper 16 to mimic the movement of the bird intended to be attracted. Neck 32 can have any size and shape with a cross-sectional area that is less than the cross-sectional area of top opening 24. For example, neck 32 can have more than two fins or have a rectangular, triangular, or another shape to control the movement of decoy body 12. Neck 32 can be comprised of multiple vertically extending components, such as pins/pedestals at the front and rear ends and a pivot point in a middle portion. However, in the disclosed embodiment as shown in FIGS. 3A, 3B, 3C, and 3E, neck 32 has an elongated shape with fins 38A and 38B at front and rear ends, respectively, and core 40 at a middle of neck 32. As shown in the disclosed embodiment, neck 32 has a similar length to the length of topper head 30 (shown in FIGS. 3A, 3B, and 3D). However, neck 32 can have a length that is greater than or less than the length of topper head 30 depending on the size and shape of top opening 24 and the amount of rotation of decoy body 12 that is desired.

Fins 38A and 38B have a width that is smaller than a width of core 40 and also smaller than a width of top opening 24. The width of fins 38A and 38B is sized to allow for moderate rotation of decoy body 12 relative to ground stake topper 16 but prevents decoy body 12 from rotating a full rotation (360 degrees). For example, width of fins 38A and 38B relative to the width of top opening 24 creates enough distance between the edges of decoy body 12 adjacent top opening 24 and fins 38A and 38B to allow for horizontal rotation of decoy body 12 up to approximately sixty degrees relative to ground stake topper 16. Thus, decoy head 18 will remain pointing in generally the same horizontal direction plus or minus approximately sixty degrees depending on wind and other external forces. Such capabilities are advantageous as it may be desired to point/place decoy system 10 a specific direction and have decoy body 12 generally stay pointing that direction while rotating only moderately to mimic the movement of a real-life bird. The width of fins 38A and 38B can be modified to provide for an increased or decreased range of rotation, with a smaller width of fins 38A and 38B relative to the width of top opening 24 resulting in a greater range of rotation and a larger width of fins 38A and 38B relative to the width of top opening 24 resulting in a smaller range of rotation.

Core 40 is between fins 38A and 38B at a middle of neck 32. Core 40 can be substantially cylindrical in shape or have another shape. Core 40 is shown as having a width that is substantially equal to (or slightly smaller than) the width of top opening 24 to provide a pivot point about which decoy body 12 rotates relative to ground stake topper 16. However, if side-to-side motion of decoy body 12 is desired, then the width of core 40 may be smaller than the width of top opening 24.

Neck 32 has a height that is at least equal to a thickness of decoy body 12 at top opening 24 (i.e., the height of neck 32 is greater than or equal to the distance between outer surface 21A and inner surface 21B of decoy body 12 adjacent top opening 24). If the height of neck 32 is substantially equal to the thickness of decoy body 12, then decoy body 12 will be limited from tilting by the top surface of disc 42 of base 34 and the underside of topper head 30. Such a configuration may be desired in some configurations of decoy system 10. However, neck 32 (as shown in FIG. 4B) has a height that is greater than the thickness of decoy body 12, so decoy body 12 is able to tilt until outer surface 21A of decoy body 12 contacts the underside of head 30, inner surface 21B of decoy body 12 contacts the top surface of disc 42, or the edge of bottom opening 22 contact ground stake 14. In the disclosed embodiment, the height of neck 32, the downward angle of the top surface of disc 42, the upward angle of the underside of head 30, and the size of bottom opening 22 are configured to allow for vertical tilt of decoy body 12 of up to approximately forty degrees relative to ground stake topper 16. Thus, decoy head 18 will remain pointing in generally the same vertical direction plus or minus approximately forty degrees depending on wind and other external forces. Such capabilities are advantageous as it may be desired to point/place decoy system 10 a specific direction and have decoy body 12 generally stay pointing that direction while tilting only moderately to mimic the movement of a real-life bird. The height of neck 32 (and the size of bottom opening 22) can be modified to provide for an increased or decreased range of tilt, with a smaller height of neck 32 relative to the thickness of decoy body 12 (and/or a smaller bottom opening 22) resulting in a smaller range of tilt and a larger height of neck 32 relative to the thickness of decoy body 12 (and/or a larger bottom opening 22) resulting in a larger range of tilt.

Figure 4A:
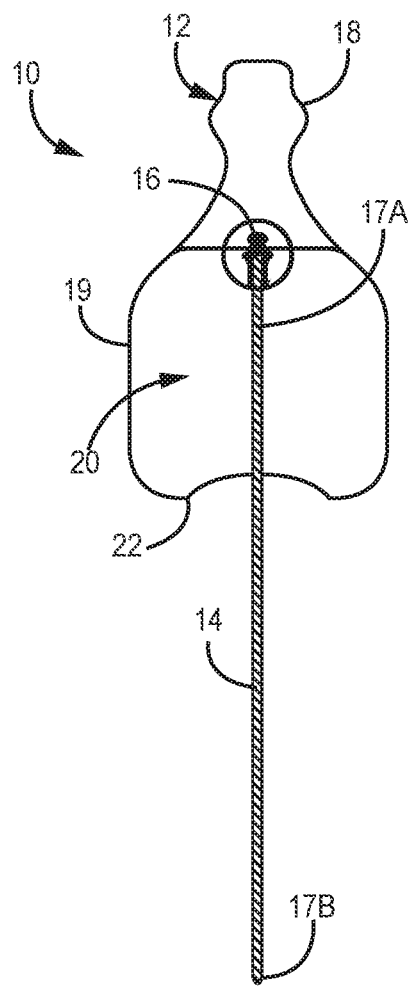
FIG. 4A is a front cross-sectional view of the decoy system.
Figure 4B:
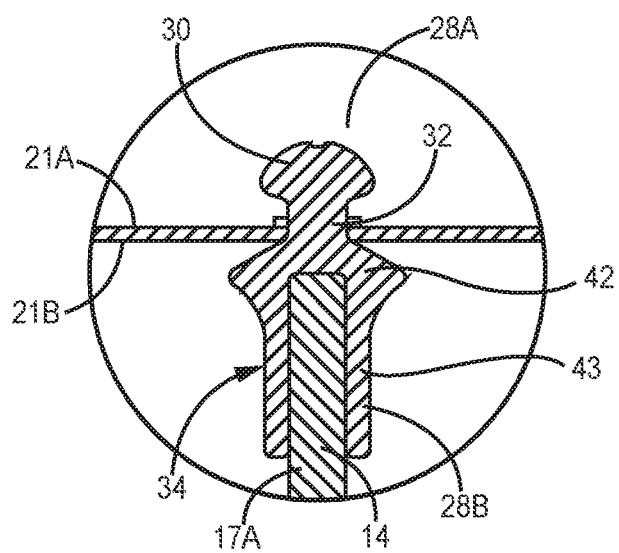
FIG. 4B is an enlarged front cross-sectional view of the ground stake topper in relation to the decoy body and ground stake.
Figure 4C:
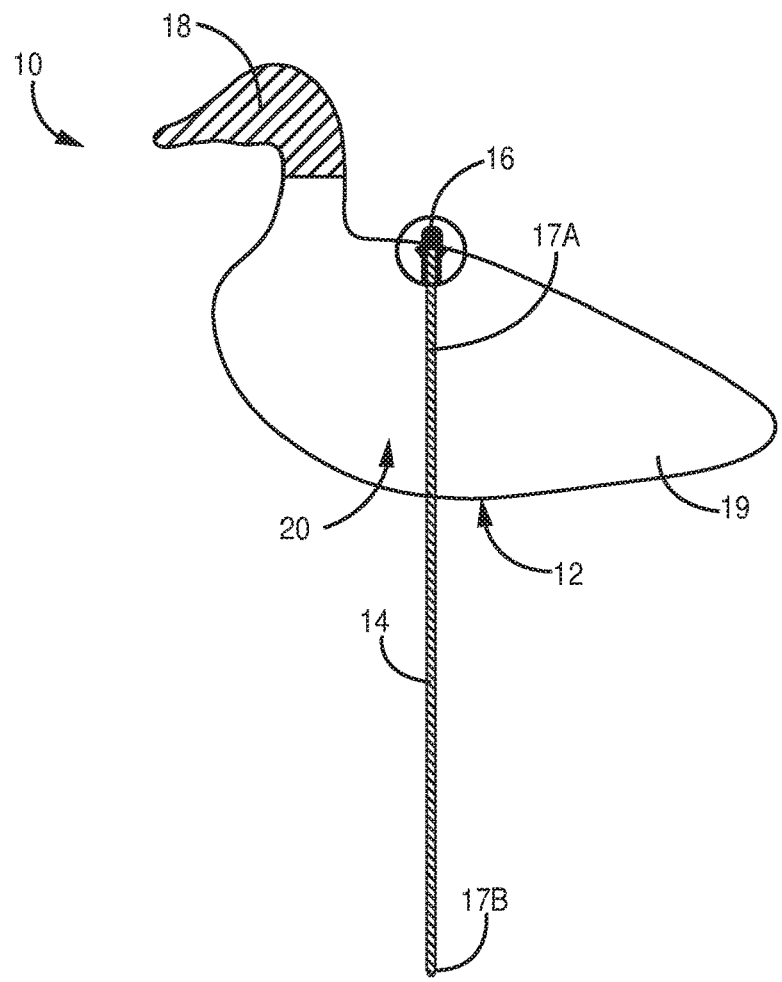
FIG. 4C is a side cross-sectional view of the decoy system.
Figure 4D:
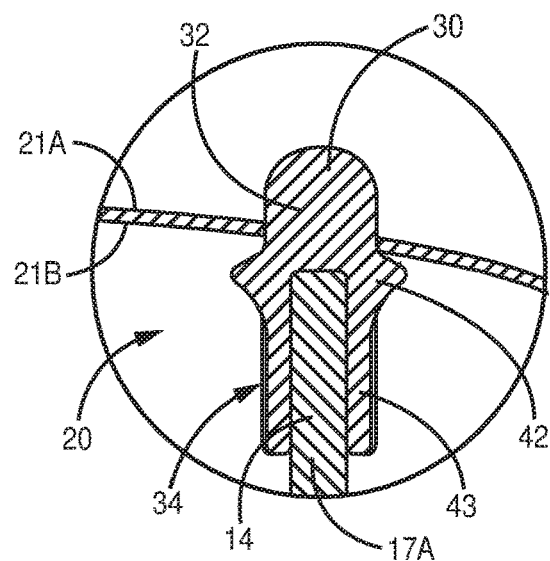
FIG. 4D is an enlarged side cross-sectional view of the ground stake topper in relation to the decoy body and ground stake.
Figure 4E:
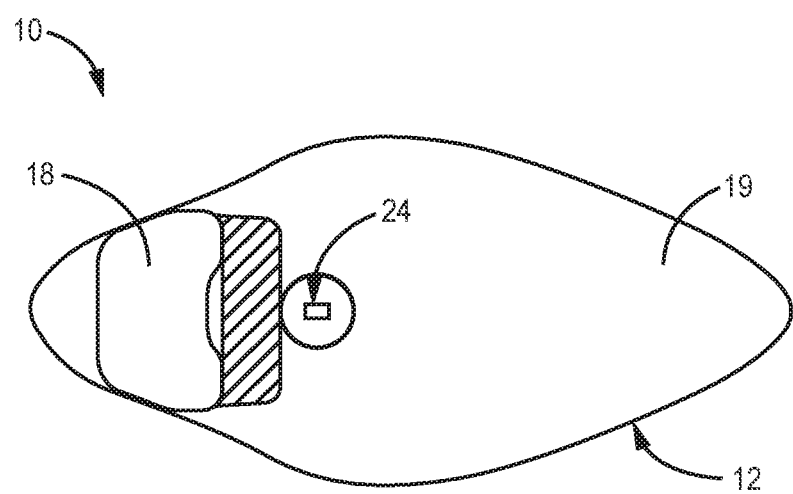
FIG. 4E is a bottom cross-sectional view of the decoy system.
Figure 4F:
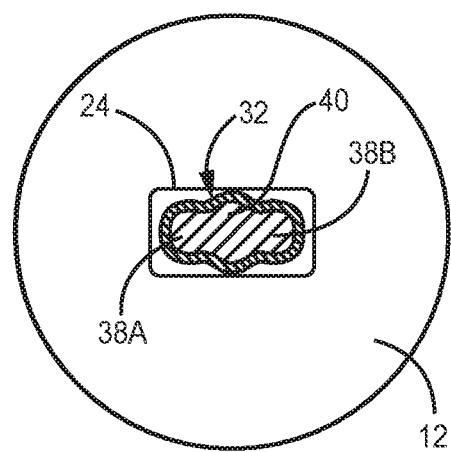
FIG. 4F is an enlarged bottom cross-sectional view of a neck of the ground stake topper in relation to a top opening of the decoy body.

FIGS. 4A-4F show the interaction of decoy body 12 (and top opening 24) with ground stake topper 16. FIG. 4A is a front cross-sectional view of decoy system 10, FIG. 4B is an enlarged front cross-sectional view of ground stake topper 16 in relation to decoy body 12 and ground stake 14, FIG. 4C is a side cross-sectional view of decoy system 10, FIG. 4D is an enlarged side cross-sectional view of ground stake topper 16 in relation to decoy body 12 and ground stake 14, FIG. 4E is a bottom cross-sectional view of decoy system 10, and FIG. 4F is an enlarged bottom cross-sectional view of neck 32 of ground stake topper 16 in relation to top opening 24 of decoy body 12.

As shown in FIGS. 4A and 4B, ground stake 14 extends through bottom opening 22 into void 20 within decoy torso 19. With ground stake topper 16 connected to top end 17A of ground stake 14, ground stake topper 16 extends through top opening 24 in decoy torso 19 so that decoy body 12 is supported by ground stake topper 16, which in turn is supported by ground stake 14. When at rest with no wind or other external forces acting on decoy body 12, decoy body 12 rests on a small portion of the top surface of disc 42 of base 34 as shown in FIG. 4B. The minimal contact between disc 42 and decoy body 12 enables tilt of decoy body 12 even when the wind (or another external force) is light. When wind or another external force is acting on decoy body 12 and causes decoy body 12 to tilt, ground stake topper 16 (head 30, neck 32, and base 36) allows for decoy body 12 to tilt relative to ground stake topper 16. Further, the tilt of decoy body 12 relative to ground stake topper 16 can be stopped from going further than a specific degree (such as 40 degrees) by ground stake 14 contacting the edge of bottom opening 22. This is also shown in FIGS. 4C and 4D, which show a side view of ground stake topper 16 in relation to decoy body 12 and ground stake 14. Head 30 and neck 32 are indistinguishable from one another in FIGS. 4C and 4D because neck 32 has a length that is equal to a length of head 30. However, FIG. 4D shows that decoy body 12 can tilt forward and rearward relative to ground stake topper 16.

FIGS. 4E and 4F show the size and shape of neck 32 in relation to top opening 24. In FIG. 4F, one can see that the elongated shape of neck 32 has a smaller cross-sectional area than the elongated shape of top opening 24 to provide space for decoy body 12 to rotate relative to neck 32 of ground stake topper 16. Fins 38A and 38B have a width that is less than a width of top opening 24 to allow for decoy body 12 to rotate, while core 40 has a width that is substantially equal to (or slightly smaller than) the width of top opening 24 to provide a pivot point about which decoy body 12 rotates. One can also see that the entire length of neck 32 is less than the length of top opening 24 to allow for additional space for decoy body 12 to rotate.

To summarize, decoy system 10 includes three main components: decoy body 12, ground stake 14, and ground stake topper 16. Ground stake topper 16 (which is affixed to top end 17A of ground stake 14) extends through top opening 24 in decoy body 12 with neck 32 of ground stake topper 16 being sized and shaped to allow for moderate tilt and rotation of decoy body 12 relative to ground stake topper 16 while also preventing large tilt and rotation (e.g., past 40 degrees tilt and 60 degrees rotation). The size and shape of bottom opening 22 also prevents large tilt by preventing further movement of decoy body 12 when the edge of bottom opening 22 contacts ground stake 14. The limitation in tilt and rotation keeps decoy body 12 from spinning completely around while in use. While the disclosed embodiment utilizes the size and shape of ground stake topper 16 relative to top opening 24 to control the movement of decoy body 12, the size and shape of opening 24 (other than a rectangular shape) can be tailored to control the movement of decoy body 12. Additionally, decoy body 12 can have a slot distant from top opening 24 to correspond a finger or another component of ground stake topper 16 that is configured to insert into the slot to control the movement of decoy body 12.

As disclosed above, decoy system 10 is utilized to attract birds, such as waterfowl. Decoy body 12 is sized and shaped to look like the body of the bird. Neck 32 of ground stake topper 16 is sized to correspond to and extend through top opening 24 in decoy body 12. Neck 32 is held adjacent to decoy body 12 by head 30 and base 34 of ground stake topper 16. Top opening 24 of decoy body 12 has a first elongated shape, and neck 32 of ground stake topper 16 has a second elongated shape with an area that is smaller than that of the first elongated shape. The size and shape of neck 32 is configured to allow decoy body 12 to tilt in every direction and rotate/twist laterally relative to ground stake topper 16 (i.e., wobble) in response to wind and other external forces. Decoy system 10 is a simple, inexpensive, and light-weight motion system that is able to wobble to realistically mimic the movement of the bird.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A decoy system for attracting birds, the decoy system comprising:
   a ground stake having a first end and a second end configured to support the decoy system;
   a decoy body having an outer surface, an inner surface, a bottom opening through which the ground stake extends, and a top opening that has a first elongated shape; and
   a ground stake topper that is configured to extend into the top opening of the decoy body, the ground stake topper having a base connected to the ground stake, a head, and a neck between the base and the head, the neck having a second elongated shape that is smaller in area than the first elongated shape of the top opening,
   wherein the neck of the ground stake topper is configured to be held within the top opening of the decoy body to allow the decoy body to moderately tilt and rotate relative to the ground stake topper, and
   wherein the neck includes two fins extending laterally away from a middle portion that has a substantially circular cross-sectionals shape with a width of the middle portion being greater than a width of the fins.

2. The decoy system of claim 1, wherein the neck of the ground stake topper extends through the top opening, the head is located adjacent the outer surface of the decoy body, and a top of the base is located adjacent the inner surface of the decoy body.

3. The decoy system of claim 1, wherein a length of the top opening is greater than a length of the neck, and a width of the top opening is greater than a width of the neck.

4. The decoy system of claim 1, wherein the bottom opening of the decoy body is larger than the top opening.

5. The decoy system of claim 1, wherein a width of the head is larger than a width of the top opening.

6. The decoy system of claim 1, wherein the head has a semispherical shape with a portion adjacent to the neck that has an upward angle.

7. The decoy system of claim 1, wherein the base of the ground stake topper includes an aperture into which the ground stake extends to connect the ground stake topper to the ground stake.

8. The decoy system of claim 1, wherein the first elongated shape of the top opening of the decoy body is rectangular in shape.

9. The decoy system of claim 1, wherein the width of the middle portion of the neck is substantially equal to a width of the top opening.

10. The decoy system of claim 1, wherein a width of the top opening is substantially equal to the width of the middle portion of the neck to allow for the decoy body to rotate laterally about the ground stake topper, but the decoy body is prevented from rotating more than sixty degrees due to edges of the top opening contacting the fins of the neck.

11. The decoy system of claim 1, wherein a length of the head is substantially equal to a length of the neck.

12. The decoy system of claim 1, wherein the bottom opening of the decoy body is oblong in shape to allow for the decoy body to tilt about the ground stake topper.

13. The decoy system of claim 1, wherein the second end of the ground stake is pointed so as to be configured to be inserted into a ground upon which the decoy system is located.

14. The decoy system of claim 1, wherein a top of the base is angled downwards to allow for the decoy body to tilt about the ground stake topper.

15. A decoy system that allows tilting and rotation of a decoy body, the decoy system comprising;
   the decoy body having a void with a first opening on a top side and a second opening on a bottom side;
   a stake for supporting the decoy body, the stake having a first end configured to extend through the void in the decoy body and a second end; and
   a topper having a base connected to the first end of the stake, a neck connected to the base and configured to extend through the first opening in the decoy body, and a head connected to the neck and configured to hold the decoy body adjacent to the topper,
   wherein the first opening of the decoy body and the neck of the topper are sized and shaped to allow for the decoy body to tilt vertically up to forty degrees relative to the topper and rotate horizontally up to sixty degrees relative to the topper.

16. The decoy system of claim 15, wherein the first opening of the decoy body has a rectangular shape.

17. The decoy system of claim 15, wherein a length of the neck is greater than a maximum width of the neck.

18. The decoy system of claim 17, wherein the neck includes two fins that extend in opposite direction along a first horizontal direction away from a core that has a circular cross-sectional shape.

19. The decoy system of claim 18, wherein a width of the core is substantially equal to a width of the first opening of the decoy body.

20. A decoy system for attracting birds, the decoy system comprising:
   a ground stake having a first end and a second end configured to support the decoy system;
   a decoy body having an outer surface, an inner surface, a bottom opening through which the ground stake extends, and a top opening that has a first elongated shape; and
   a ground stake topper that is configured to extend into the top opening of the decoy body, the ground stake topper having a base connected to the ground stake, a head, and a neck between the base and the head, the neck having a second elongated shape that is smaller in area than the first elongated shape of the top opening, wherein the neck of the ground stake topper is configured to be held within the top opening of the decoy body to allow the decoy body to moderately tilt and rotate relative to the ground stake topper, and wherein a top of the base is angled downwards to allow for the decoy body to tilt about the ground stake topper.

\* \* \* \* \*